(12) United States Patent
Van Den Bossche et al.

(10) Patent No.: US 8,674,525 B2
(45) Date of Patent: Mar. 18, 2014

(54) COMBINED HEAT POWER SYSTEM

(75) Inventors: Alex Van Den Bossche, Herzele (BE);
Bart Meersman, Lokeren (BE)

(73) Assignee: Universiteit Gent, Ghent (BE)

( * ) Notice: Subject to any disclaimer, the term of this patent is extended or adjusted under 35 U.S.C. 154(b) by 302 days.

(21) Appl. No.: 12/668,351

(22) PCT Filed: Jul. 9, 2008

(86) PCT No.: PCT/EP2008/058950
§ 371 (c)(1),
(2), (4) Date: Jan. 8, 2010

(87) PCT Pub. No.: WO2009/007408
PCT Pub. Date: Jan. 15, 2009

(65) Prior Publication Data
US 2010/0194111 A1 Aug. 5, 2010

(30) Foreign Application Priority Data
Jul. 9, 2007 (EP) ..................................... 07013365

(51) Int. Cl.
*F02B 63/04* (2006.01)
*H02K 7/18* (2006.01)
(52) U.S. Cl.
USPC ........................................................ 290/1 A
(58) Field of Classification Search
USPC ............... 290/1 A; 60/600–624, 639–641.15, 60/642–684, 685–699
See application file for complete search history.

(56) References Cited

U.S. PATENT DOCUMENTS

| | | | | |
|---|---|---|---|---|
| 3,520,133 A | * | 7/1970 | Loft et al. | ............... 60/790 |
| 3,630,839 A | * | 12/1971 | Podolsky | ............... 376/217 |
| 3,638,422 A | * | 2/1972 | Loft et al. | ............... 60/39.281 |
| 3,639,076 A | * | 2/1972 | Rowen | ............... 416/30 |
| 3,729,928 A | * | 5/1973 | Rowen | ............... 60/39.281 |
| 3,987,620 A | * | 10/1976 | Giordano et al. | ............... 60/39.281 |

(Continued)

FOREIGN PATENT DOCUMENTS

| | | |
|---|---|---|
| DE | 102005048795 B3 | 12/2006 |
| EP | 1 081 338 A2 | 3/2001 |

(Continued)

OTHER PUBLICATIONS

International Search Report in PCT/EP2008/058950, Jun. 29, 2009.

*Primary Examiner* — Pedro J Cuevas
(74) *Attorney, Agent, or Firm* — Bacon & Thomas, PLLC

(57) ABSTRACT

A combined heat power system comprises a Rankine cycle, optionally an organic Rankine cycle, using a fluid both in gaseous phase and liquid phase. The Rankine cycle comprises—an evaporator for evaporating the fluid from liquid phase to gaseous phase, an expander for expanding the fluid in gaseous phase provided by the evaporator. The expander is suitable to transform energy from the expansion of the fluid in gaseous phase into mechanical energy, —a condenser for condensing the fluid from gaseous phase from the expander to liquid phase and—a liquid pump for pumping the fluid in liquid phase provided by the condenser to the evaporator. The system comprises a heat source providing exhaust gas. The exhaust gas provides thermal energy for evaporating the fluid from liquid phase to gaseous phase by the evaporator. The system further comprises a generator unit for converting mechanical energy from expander to electrical energy. The expander is a volumetric expander.

18 Claims, 9 Drawing Sheets

(56) References Cited

U.S. PATENT DOCUMENTS

| | | | |
|---|---|---|---|
| 4,024,908 A * | 5/1977 | Meckler | 165/225 |
| 4,079,263 A * | 3/1978 | Inoue | 290/52 |
| 4,150,546 A * | 4/1979 | Collett | 376/211 |
| 4,188,781 A * | 2/1980 | Johnson et al. | 60/39.281 |
| 4,299,088 A * | 11/1981 | Rowen et al. | 60/39.27 |
| 4,358,929 A * | 11/1982 | Molivadas | 60/641.8 |
| 4,362,020 A * | 12/1982 | Meacher et al. | 60/657 |
| 4,389,847 A * | 6/1983 | Kehlhofer | 60/659 |
| 4,462,212 A * | 7/1984 | Knoos | 60/526 |
| 4,562,995 A * | 1/1986 | Enjo et al. | 252/67 |
| 4,651,531 A * | 3/1987 | Enjo et al. | 60/651 |
| 4,773,826 A * | 9/1988 | Mole | 417/50 |
| 4,779,424 A * | 10/1988 | Sumitomo et al. | 60/649 |
| 4,809,497 A * | 3/1989 | Schuh | 60/39.27 |
| 4,841,916 A * | 6/1989 | Sumitomo et al. | 122/32 |
| 5,042,246 A * | 8/1991 | Moore et al. | 60/773 |
| 5,042,247 A * | 8/1991 | Moore | 60/773 |
| 5,058,373 A * | 10/1991 | Moore | 60/39.27 |
| 5,069,030 A * | 12/1991 | Moore | 60/39.27 |
| 5,099,643 A * | 3/1992 | Moore | 60/39.182 |
| 5,131,231 A * | 7/1992 | Trimble et al. | 60/649 |
| 5,199,256 A * | 4/1993 | Moore | 60/39.182 |
| 5,507,145 A | 4/1996 | Kurten et al. | 60/652 |
| 5,635,768 A * | 6/1997 | Birch et al. | 290/40 C |
| 5,699,666 A * | 12/1997 | Kurten et al. | 60/652 |
| 6,053,418 A * | 4/2000 | Guyer | 237/12.1 |
| 6,107,693 A * | 8/2000 | Mongia et al. | 290/52 |
| 6,198,786 B1 * | 3/2001 | Carroll et al. | 376/211 |
| 6,313,544 B1 * | 11/2001 | Mongia et al. | 290/52 |
| 6,536,215 B1 * | 3/2003 | Vikstrom | 60/641.1 |
| 6,598,397 B2 * | 7/2003 | Hanna et al. | 60/651 |
| 7,010,920 B2 * | 3/2006 | Saranchuk et al. | 60/670 |
| 7,019,412 B2 * | 3/2006 | Ruggieri et al. | 290/2 |
| 7,045,913 B2 * | 5/2006 | Ebrahim et al. | 290/52 |
| 7,067,950 B2 * | 6/2006 | Hirzel et al. | 310/216.094 |
| 7,078,825 B2 * | 7/2006 | Ebrahim et al. | 290/52 |
| 7,143,584 B2 * | 12/2006 | McKelvey et al. | 60/778 |
| 7,230,361 B2 * | 6/2007 | Hirzel | 310/216.074 |
| 7,274,111 B2 * | 9/2007 | Andrew et al. | 290/52 |
| 7,350,372 B2 * | 4/2008 | Wells | 62/324.1 |
| 7,355,297 B2 * | 4/2008 | Andrew et al. | 290/52 |
| 7,586,216 B2 * | 9/2009 | Li et al. | 307/151 |
| 7,615,881 B2 * | 11/2009 | Halsey et al. | 290/52 |
| 7,622,817 B2 * | 11/2009 | El-Refaie et al. | 290/52 |
| 7,681,401 B2 * | 3/2010 | Ziminsky et al. | 60/773 |
| 7,898,101 B1 * | 3/2011 | Huber | 290/52 |
| 2003/0015873 A1 * | 1/2003 | Khalizadeh et al. | 290/7 |
| 2003/0029169 A1 * | 2/2003 | Hanna et al. | 60/651 |
| 2003/0213245 A1 * | 11/2003 | Yates et al. | 60/651 |
| 2003/0213246 A1 * | 11/2003 | Coll et al. | 60/653 |
| 2003/0213247 A1 * | 11/2003 | Hanna et al. | 60/670 |
| 2003/0213248 A1 * | 11/2003 | Osborne et al. | 60/670 |
| 2003/0213854 A1 * | 11/2003 | Stickford et al. | 237/12.1 |
| 2004/0083732 A1 * | 5/2004 | Hanna et al. | 60/651 |
| 2004/0216460 A1 * | 11/2004 | Ruggieri et al. | 60/670 |
| 2004/0226296 A1 * | 11/2004 | Hanna et al. | 60/671 |
| 2004/0245879 A1 * | 12/2004 | Hirzel et al. | 310/156.01 |
| 2005/0086971 A1 * | 4/2005 | Wells | 62/324.2 |
| 2005/0193758 A1 * | 9/2005 | Wells | 62/324.2 |
| 2006/0186669 A1 * | 8/2006 | Ruggieri et al. | 290/2 |
| 2006/0208606 A1 * | 9/2006 | Hirzel | 310/268 |
| 2006/0213218 A1 | 9/2006 | Uno et al. | 62/467 |
| 2006/0233000 A1 * | 10/2006 | Akagi | 363/37 |
| 2007/0007771 A1 * | 1/2007 | Biddle et al. | 290/7 |
| 2007/0279815 A1 * | 12/2007 | Li et al. | 361/54 |
| 2008/0143108 A1 * | 6/2008 | El-Refaie et al. | 290/43 |
| 2008/0163625 A1 * | 7/2008 | O'Brien | 60/651 |
| 2009/0064653 A1 * | 3/2009 | Hagen et al. | 60/39.3 |
| 2013/0247558 A1 * | 9/2013 | Maruya | 60/597 |

FOREIGN PATENT DOCUMENTS

| | | |
|---|---|---|
| EP | 1 221 573 A1 | 7/2002 |
| GB | 2405458 A | 3/2005 |
| WO | 93/10334 | 5/1993 |
| WO | 98/15777 | 4/1998 |

* cited by examiner

COMBINED HEAT POWER SYSTEM

TECHNICAL FIELD OF THE INVENTION

The present invention relates to a distributed generation system, e.g. a combined heat-power system (CHP), adapted to convert thermal energy to electrical energy from low power energy resources, such as domestic heating and medium sized buildings as well as to methods of converting thermal energy to electrical energy from low power energy resources. The electrical energy can be provided to a grid or for charging a battery by means of an inverter.

BACKGROUND OF THE INVENTION

Systems for recuperating energy in the form of electrical energy from lower power energy sources, such as exhaust gas of domestic heating and medium sized buildings are known.

An example is disclosed in EP1221573. Thermal energy is provided by means of a burner for combustion of dry biomass, being a thermal energy source having a low power thermal energy output. The system comprises an organic Rankine cycle. In the organic Rankine cycle, thermal oil is evaporated to oil vapour, which evaporated oil is to drive a turbine in which the vapour expands. After the oil vapour is expanded, the oil vapour is condensed in a heat exchanger, being a condenser. The cold side of the condenser is water from a heating system.

Some thermal energy sources may have a large response time, and are to adjust the thermal energy output by modulating, i.e. reducing or increasing the combustion speed, rather than switching between on and off status as is frequently used for gas burners.

SUMMARY OF THE INVENTION

It is an object of the present invention to provide a distributed generation system, e.g. a good combined heat power system, adapted to convert thermal energy to electrical energy from low power energy resources, such as domestic heating and medium sized buildings, as well as to methods doing the same. It is an advantage of the combined heat power system to be able to be provided with heat from a heat source which may be varied from 100% heat output capacity (i.e. the maximum heat output capacity) to about 20% of its maximum heat output capacity, still being able to efficiently provide electrical or mechanical energy.

The above objective is accomplished by combined heat power systems according to the present invention.

According to a first aspect of the present invention, a combined heat power system is provided. The combined heat power system comprises a Rankine cycle using a fluid both in gaseous phase and liquid phase. The Rankine cycle comprises
  an evaporator for evaporating the fluid from liquid phase to gaseous phase,
  an expander for expanding the fluid in gaseous phase provided by the evaporator. The expander is suitable to transform energy from the expansion of the fluid in gaseous phase into mechanical energy,
  a condenser for condensing the fluid from gaseous phase from the expander to liquid phase and
  a fluid pump, e.g. a liquid pump, for pumping the fluid in liquid phase provided by the condenser to the evaporator.

The system comprises a heat source providing exhaust gas. The exhaust gas provides thermal energy for evaporating the fluid from liquid phase to gaseous phase by the evaporator. The system further comprises a generator unit for converting mechanical energy from the expander to electrical energy. The expander is a volumetric expander.

Volumetric expanders are also known as positive displacement expanders.

According to some embodiments of the present invention, the Rankine cycle may be an organic Rankine cycle using organic fluid in both gaseous and liquid phase. Optionally the organic fluid may be a carbon containing chemical fluid or an other fluid such as sulphur dioxide, ammonia and silicon based fluid.

A combined heat power system has the advantage of a long lifetime, since temperatures can be limited and the fluid and possibly oil are not contaminated by dust or pollutants of ambient air. A hermetic enclosure may be provided to reduce maintenance interventions, hence costs. A lower noise may be obtained, in particular when rotary volumetric expanders are used. The system may be made compact as the operating minimum pressure can be higher than the atmospheric pressure and as the fluid pump only uses a fraction of the output power.

The system has the advantage that it can be used with thermal energy sources having a low power thermal energy output. Such energy sources are to adjust the thermal energy output by varying or modulating, i.e. reducing or increasing the combustion speed, rather than switching between on and off status as is frequently used for gas burners.

The systems according to the first aspect of the present invention further have the advantage that the volumetric expanders allow efficient conversion to mechanical energy, at a wide range of operation speeds.

Though the systems according to the first aspect of the present invention is advantageously used with thermal energy sources having a low power thermal energy output and which is to be varied or modulated and are difficult or even not operable in an on/off switching regime, the systems could be used with other energy sources as well.

According to some embodiments, the heat source may be a burner for burning biomass, such as burners of domestic or greenhouse heating systems.

The burner may be suitable to burn dry biomass or vegetable or animal oils, fats or greases. The ash of dry biomass can be used as fertiliser and is not a waste.

Alternatively the heat source may be the waste thermal energy of a combustion engine such as a diesel combustion engine, in particular engines running for a long period in steady state regime such as engines of boats or trains or long distance trucks. The energy, which may be recuperated from a combustion engine, may be a part of the thermal energy from the engine cooling circuit, as well as part of the thermal energy present in the exhaust gasses.

The water cooling circuit may use the fluid in liquid phase from the combined heat power system. This fluid is partly evaporated by the thermal energy obtained from cooling the engine. The vapour may be generated in the motor cooling circuit. A heat exchanger at the level of the burnt gases of the exhaust is used to complete the evaporation. Possibly the fluid in gaseous phase is overheated by means of this heat exchanger. The fluid in gaseous phase is expanded in a volumetric expander. The mechanical energy obtained from the expander is utilized either directly, or is used to generate electric energy for being provided to a grid of for charging a battery. In case the electric energy is stored in a battery, the system permits a hybrid (partially electrically driven) operation of a vehicle. After condensing in a condenser, e.g. in a radiator, the fluid in liquid phase may be pumped again to the motor cooling circuit for evaporation, hence to complete the ORC cycle.

According to some embodiments, the expander may be a rotary volumetric expander.

According to some embodiments, the generator unit may comprise a rotary generator.

According to some embodiments, the expander, the rotary generator and the fluid pump may be coaxially mounted.

According to some embodiments, the expander, the rotary generator and the fluid pump may be mounted in one or more gas-tight units.

The presently known combined heat-power systems are not fully hermetically sealed and use sealing rings at shafts, e.g. a power shaft of turbine, so that there is a risk of leaks and require maintenance. Those gas-tight seals are also the origin of friction power losses.

It has been found that for some embodiments of the combined heat power system according to the first aspect of the present invention, the rotary expander, rotary generator and the liquid pump can be mounted in one gas-tight unit. As no rotating axes are to extend through the wall of the gas-tight unit, no problems of sealing the rotating axes are met.

According to some embodiments, the rotary generator may be a high efficiency generator.

For presently known systems, the efficiencies get very low at reduced speed as a large part of the losses remain but the input power is reduced. A low loss, high efficiency generator allows wide variable or modulated operation ranges to be used.

According to some embodiments, the rotary generator may be a high efficiency variable speed generator.

According to some embodiments, the system may be part of a central heating system.

The systems are useful as small combined heat power systems.

According to an independent aspect of the present invention, a power system may be electrically coupled to the electric power grid by means of said generator unit or to an electrical storage unit such as a battery, said generator unit further comprising a converter for converting the frequency of said rotary generator to the grid frequency.

The converter allows choosing the operating frequency range of the generator. This allows a higher efficiency of the generator and allows also injecting power into the grid with a power factor close to 1.

The present invention also provides a method generating energy in a combined heat power system comprising a Rankine cycle, said Rankine cycle using a fluid both in gaseous phase and liquid phase, the method comprising evaporating the fluid from liquid phase to gaseous phase,
expanding the fluid in gaseous phase,
transforming energy from the expansion of the fluid in gaseous phase into mechanical energy,
condensing the fluid from gaseous phase to liquid phase, and
pumping the fluid in liquid phase for evaporation,
providing a heat source of exhaust gas,
evaporating the fluid from liquid phase to gaseous phase using the thermal energy of said exhaust gas, and
converting mechanical energy to electrical energy.

Optionally the fluid is an organic fluid, e.g. a carbon containing chemical fluid or an other fluid such as sulphur dioxide, ammonia and silicon based fluid.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
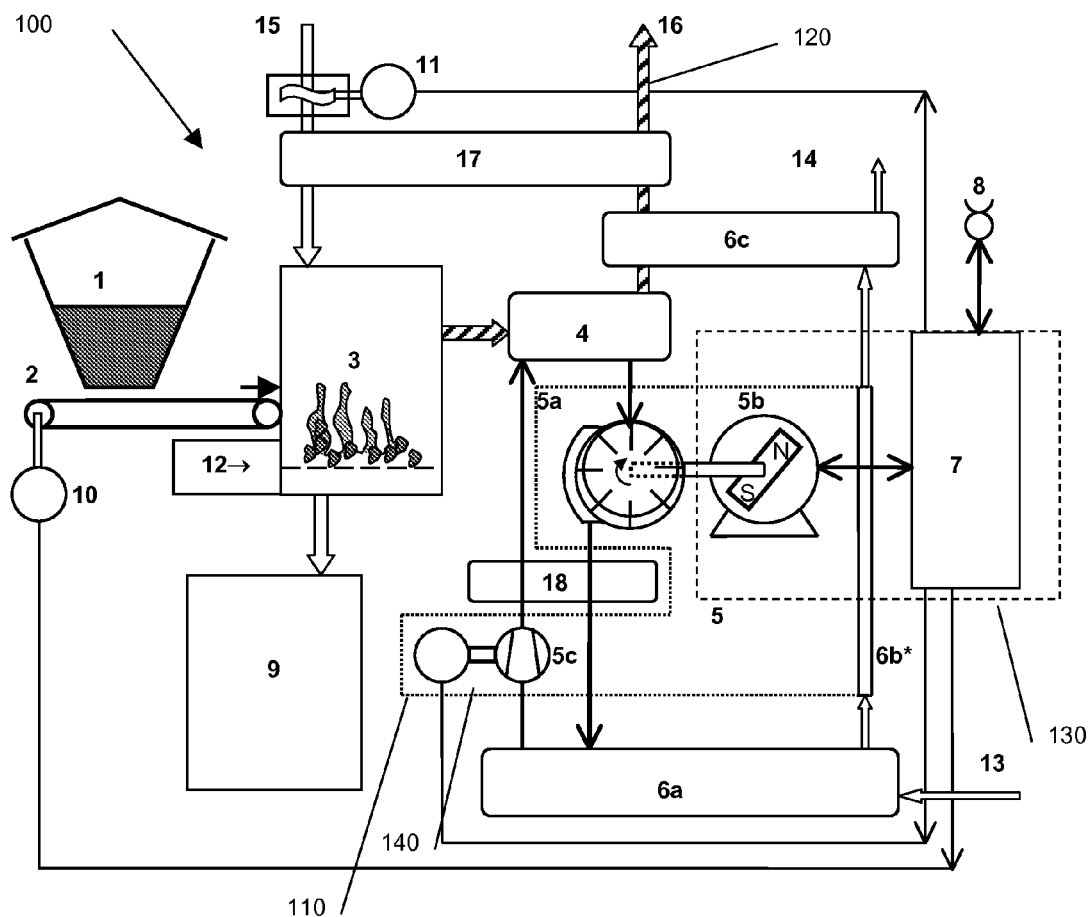
FIG. 1 is a schematically view of a central heating system comprising a combined heat power system according to a first embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other. The term "electrically coupled" is to be understood as there is a contact, either direct or not, with contact allows transferring or electrical current between the elements being electrically coupled.

The following terms are provided solely to aid in the understanding of the invention.

A "combined heat power system" is a system used to produce heat and power simultaneously. This power may be mechanical power or electrical power. The electrical power is obtained by converting mechanical power to electric power. In small and domestic use, the mechanical power can be used for distributed electrical generation.

"Transcritical operation" means compressing the fluid above the critical pressure and heating above the critical temperature and expanding below the critical pressure and condensing below the critical temperature.

"Volumetric expander" or "positive displacement expander" means an expander of which per cycle of its reciprocating movement, such as per complete rotation, a gas is expanded from a small given volume per rotation to a given larger volume per rotation.

In relation to high efficiency generators, common electrical machines have mainly copper and iron losses. The 'copper losses' are often torque related, whereas the 'iron losses' are more speed related.

The efficiency is given by:

$$\text{Efficiency} = \frac{\text{Input Power} - \text{Power Loss}}{\text{Input Power}}$$

For a motor, the input power is electrical; the output power mechanical. For a generator, the input power is mechanical, the output electrical. As the losses are subtracted from the mechanical power in the generator mode, the efficiency is usually lower than the corresponding motor operation. At low speed and similar to nominal torque, the copper losses are similar to the full load, but the output power is much lower. This has the tendency to lower the efficiency when the thermal power is modulated to lower power levels. The most used machines in industry are induction machines. For example, the state of the art four pole induction motors for 50 Hz have an efficiency of >=83.8% for 1.1 kW and >=91% for 11 kW (efficiency 1 class motors CEMEP). In generator mode and lower speed, the efficiency is reduced. When using high efficiency designs, as described further on, nominal efficiencies above 90% for 1.1 kW and above 95% efficiency at 11 kW can be easily obtained. The term "high efficiency generator" is thus to be understood as a generator with nominal efficiencies above 90% for 1.1 kW and above 95% efficiency for 11 kW.

A combined heat power system 110 according to the first aspect of the present invention, e.g. being part of a domestic or small building central heating system 100 is shown in FIG. 1.

The combined heat-power system 110 comprises a Rankine cycle, in this particular embodiment an organic Rankine cycle (ORC), which ORC comprises a fluid both in gaseous phase and liquid phase. This fluid is called 'organic' to make a distinction from an inorganic fluid such as water. 'Organic' fluids may be carbon containing chemical fluids or other fluids such as sulphur dioxide, ammonia and silicon based fluids. The ORC comprises an evaporator 4 for evaporating the organic fluid from liquid phase to gaseous phase, an expander 5*a* for expanding the organic fluid in gaseous phase provided by the evaporator, a condenser, e.g. comprising several coupled condensers 6*a*, 6*b*, 6*c* for condensing the organic fluid from gaseous phase from the expander to liquid phase and a liquid pump 5*c* for pumping the organic fluid in liquid phase from the condenser to the evaporator. The system further comprises a heat source 3 being a dry biomass burner, and providing exhaust gas whose flow is in general indicated with hatched arrows 120.

The exhaust gas provides thermal energy to evaporate the organic fluid from liquid phase to gaseous phase in the evaporator 4. The expander 5*a* is suitable to transform energy from the expansion of the organic fluid in gaseous phase into mechanical energy. The system 110 further comprises a generator unit 130 for converting mechanical energy from expander 5*a* to electrical energy. The generator unit 130 comprises a high efficiency generator 5*b* being driven by the expander 5*a*, and an EC-unit 7 (i.e. Electronic Converter) for converting and coupling the electrical current from the generator to the grid 8. The expander 5*a* is a volumetric expander.

Optionally, the expander 5*a* is a rotary expander, providing mechanical energy by means of a rotating shaft. Optionally, the generator 5*b* is a rotary generator, being driven by rotating a shaft. Optionally, the liquid pump 5*c* is a rotary pump or multi-piston reciprocating pump.

Figure 9A:
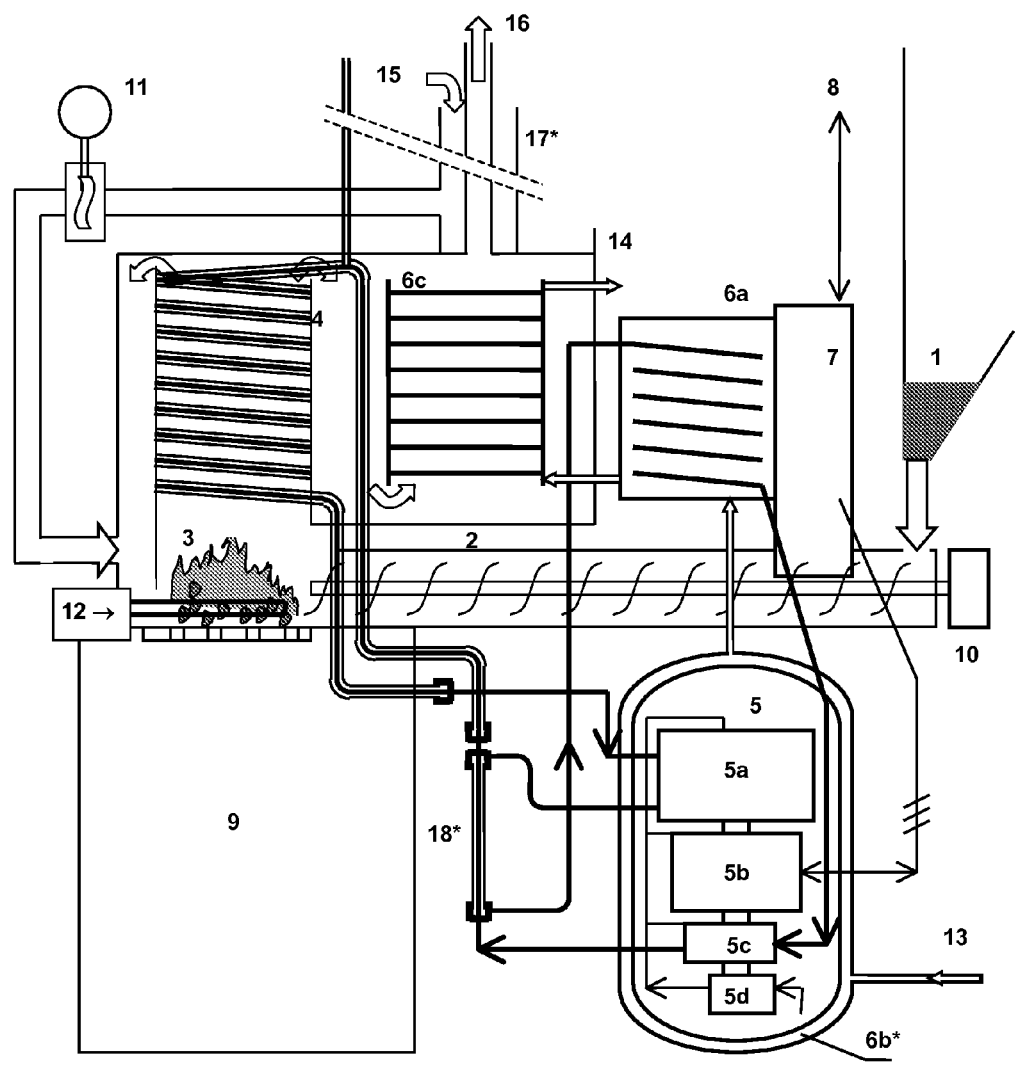
FIG. 9a, FIG. 9b and FIG. 9c show more details of the combined heat power system of FIG. 1.

Not shown in FIG. 1 but shown in FIG. 9*a*, the system may further comprise an oil pump 5*d* for providing oil to the generator 5*b*, expander 5*a* and liquid pump 5*c*. The provision of oil as lubricant extends the lifetime and reduces the friction and the leaks of the compression and expansion chambers. The oil pump assures a reliable lubrication of the moving mechanical parts. In case the volumetric expander 5*a* is a sliding vane expander, the oil can also be pumped to the rotor to help pushing the vanes outside and possibly avoiding springs to realize it. All this is done in order to obtain a good low speed behaviour.

After the expander, the fluid may be still in the vapour phase, allowing to separate the oil from the vapour. This version may use a separate oil pump. After the condenser, the fluid can be collected in the liquid state. The oil may be also pumped together with the working fluid, and possibly separated afterwards. It is good to use high temperature grade oil like ricinus castor oil, fluorinated oil, siloxane or silicone oil, polyolether or polyol ester types. However working fluids like toluene may be also lubricating at the same time.

The oil pump 5*d* may be avoided, while taking some oil from the outlet of the expander, while providing an oil bath and a large output opening by splashing or similar means.

The generator 5*b*, expander 5*a*, liquid pump 5*c* and oil pump 5*d* are put in one gas-tight enclosure or gas-tight unit 5. No axis has to leave the hermetic or gas-tight enclosure 5. This avoids shaft seals and the leaks and friction losses associated with them. The generator, expander, liquid pump and oil pump are rotary elements and may be put on the same axis, which allows making a light and compact gas-tight enclosure 5. The closed system avoids losses by gas-tight seals of shafts and allows a proper use of oil. The use of oil is also beneficial when reduced rotating speeds are used, such as 300 to 1000 rpm. Such rotating speeds occur when the burner is modulated down to a small part of its full load. At constant pressure, and substantially no leak flow in the expander, the speed is substantially proportional to the flow and so the mechanical power is substantially proportional with the speed. The full rotating speed may be 2000 rpm or more. The full rotation speed may depend on the external aspects or requirements, such as the compactness of the expander, the required life time of the expander, and/or a compromise made between such aspects or requirements.

The combination on one axis is possible as the rotating parts can be operated at similar speeds. The sequence of the generator 5*b*, expander 5*a*, liquid pump 5*c* and oil pump 5*d* could be changed, but it is preferred to have the oil at the bottom, the condensed fluid in the middle and the vapour of the fluid at the top as the density of the vapour is less than the fluid and the oil has usually a higher density than the fluid. The axis direction of the combination can be vertical, horizontal or inclined.

The use of an organic working fluid allows operating at higher pressures than pure water and reduces the size and the losses. A separate oil pump may be avoided if the fluid pump takes some oil together with the organic fluid of the ORC. The oil may circulate along the evaporator 4, or may be separated in an oil separator (20 in FIG. 10*b*).

Optionally, the generator 5*b* is a permanent magnet AC motor or a Brushless DC (BLDC) type with or without rectifier and inverter.

The liquid pump 5*c* in an ORC is much smaller than the expander 5*a* and needs only a fraction of the output power of the expander 5*a*. In this way, the system 110 can be provided with reduced space and weight.

Turning to the operation principle, the central heating system 100 further comprises an adjustment of the speed of the fuel admission conveyor 2 and the speed of the fan 11 for combustion air control (e.g. a variable speed brushless DC motor) provided to the air inlet 15. The heat demand required from the central heating system 100 delivers the set point for the fuel admission conveyor 2, in this particular case dry biomass. The air admission fan follows the required air for proper combustion. The preferred fuel for the application is dry biomass: wood, energy crops, processed straw or grass, dry residues of food production or excess or low quality animal food types. It can be in pellets, pieces, or chopped type. The ash of most dry biomass can be used as fertilizer or can be a base product for fertilizers. Also fossil fuels like coal, lignite or petroleum cokes could be used, but the ash is then usually a waste.

When the pressure of the evaporator 4 increases, due to an increasing heat demand, the speed of the expander 5*a* and thus of the generator 5*b* increases due to the fact that the expander 5*a* is the volumetric expander. In such way, more flow is obtained and more power is delivered to the converter 5*b* and to the grid 8. When the pressure of the evaporator 4 decreases, in a similar way the rotation speed of the generator 5*b* decreases, thus less electrical energy is provided to the grid 8. Due to the presence of a volumetric expander, the efficiency of converting energy by the expander is only slightly affected by the variations in rotation speed, hence allows obtaining a wide power input range at good efficiency The system can be further automated with a starting system based on electricity, gas, or a liquid fuel.

For the systems according to the present invention, the efficiency from fuel to electricity is typically in the range of 10 to 25%. The upper range is caused by the fact that the temperature difference is not extreme, limiting the Carnot factor. The highest temperature is limited by the necessary excess air for burning dry substances. Also, above 300° C., the corrosion of metals increases and the metal alloys get more expensive. High evaporator temperatures will also generate more heat losses to the ambient room. Operating fluids may also degrade above their stability limit temperature. The lower temperature in this embodiment is limited by the central heating fluid temperature which is often 50° C. or more. Also some temperature drops exist in heat exchangers. If the maximal efficiency is desired, a two-stage or multistage expander may be an advantage. The lower end of the efficiency range corresponds to the fact that a variable regime is used over the day and over the year and starting and stopping effects. The efficiency is in fact a tradeoff of cost of materials (which contain also energy) and the energy saving possibility. So some recuperating heat exchangers can be omitted to reduce the cost, or in order to use higher temperature water for sanitary hot water.

The total energy efficiency, from fuel to heat and electricity combined, easily exceeds 90%. This figure is mainly limited by unconsumed residues, residual heat in the chimney and heat losses to ambient. The losses to ambient may be reduced by limiting the surface to ambient and a good thermal insulation. Hence, a compact system helps to achieve a high combined heat and electricity efficiency. A good combustion can be achieved with diverse dry biomass fuels, reducing the unconsumed residues. The losses to the chimney are reduced while using a heat recovery with inlet air, the fan gives the necessary air pressure. The low sulfur content and the base nature of the ash of dry biomass allows to cool the exhaust air to quite low temperatures, without corrosion of the chimney.

For mobile use (vehicles, ships, railway) the principle may be used directly or using the waste energy of the exhaust of a diesel or gasoline engine.

Turning now to particular elements as shown in FIG. 1, the fuel used to be combusted in the burner 3 and optionally stored in a container 1 may be dry biomass like diverse pellets from wood, straw, energy crops, paper, corn, maize stem and leaves, hay but also other fuels like broken wood, shelled maize, coconut shells, nut shells, cherry pits, rice paddy, bran, dried pulp. Also charcoal is possible. The same heat conversion principle may be applied on liquid fuels, like vegetable or animal grease. Also coal and lignite may be alternative fuels to be used. The heat conversion technology is also applicable to other forms of heat input like waste heat, e.g. the exhaust of diesel or gasoline engines.

The storage container 1 avoids contamination by moisture and to avoid outside contamination by fly-dust.

The solid fuel may be transported by a controlled conveyer belt 2 bringing the fuel to the burner 3. Alternatively a screw or a reciprocating means in any direction (side, upwards, downwards) may be used. Liquid types of fuels may be normally provided by a pump.

The burner 3 may be a grid type, tube or hole type, perforated metal plate type, fluidized bed, or using refractory material (perforated or not). The fuel may fall down, pushed from the side or pushed up form the bottom into the burning area. Some way of shaking or vibration may help to remove ashes from the burning area.

The working fluid or the ORC usually give more pressure for a given temperature than water. Examples are (for alkanes: n-, iso- or cyclo-): propane, butane, pentane, hexane, toluene, xylene, naphthalene, R600a, R601, R601a, heptane, octane, cetane, decane, undecane, dodecane, . . . methanol, ethanol, fluorine and chlorine hydrocarbons R114, R141b, R152a, R134, siloxanes. They can be used pure or in mixtures. Pure ammonia is also possible but is corrosive in the presence of water, and not preferred if the electrical parts are also put in the hermetic enclosure. The system can be run as well below critical point (subcritical) or above the critical point (transcritical) For example, transcritical for butane (critical point 38 bar, 152° C.) means pumping above 38 bar (4 MPa) and heating beyond 152° C. and expanding at lower temperatures and pressures. A subcritical cycle remains below the critical pressure, a transcritical cycle pumps above the critical pressure and heats above the critical temperature, it expands below the critical pressure and temperature. Transcritical operation needs less flow (volume/second) per section in the evaporator and thus has the advantage that it can use smaller tubes. As it needs more pressure, also higher efficiencies may be obtained by a higher temperature difference.

As a general rule, there is a compromise: fluids molecules with a lot of hydrogen atoms are easily flammable, fluorine atoms are harmful for the ozone layer, chlorine atoms increase the toxicity.

With regard to the evaporator 4, the corrosion resistance should be in line with the kind of fuel used.

The evaporator 4 can evaporate the working fluid directly or by means of thermal oil heat exchanger allowing to take some distance and to alleviate safety concerns. As the working fluid is at high temperature and pressure in the evaporator 4, the evaporator 4 may be a potential source of explosion or fire hazard. This hazard can be greatly reduced by using a heat transfer with thermal oil, as will further be shown in FIG. 9

Optionally, the liquid pump 5c is a volumetric pump, such as e.g. a gear pump, vane pump, screw pump, scroll pump, reciprocal piston pump, rolling cylinder pump, positive displacement pumps, membrane pumps, hypocycloid pumps, epicycloids pumps, planetary gear pump, bellows pump. Reciprocal pumps may give a lot of pressure pulsation and vibration. An advantage of some vibration may be the cleaning of dust in the evaporator.

A pressurised gas volume delivers energy by expanding through an expander, such as the volumetric expander 5a according to the present invention. The volumetric expander 5a may comprise e.g. an engine such as a vane expander, screw expander, scroll expander, reciprocal piston expander, rolling cylinder expander, positive displacement expander, hypocycloid expander, epicycloid expander. The expander may be a single expander or cascaded expander.

With regard to the generator unit 130, generators 5b with a higher efficiency, lower volume and lower weight may be used. Good efficiencies are obtainable with permanent magnet AC generators, brushless DC generators, switched reluctance generators, hybrid (combined reluctance-magnet effect) motors. They can be used in radial (inner or outer rotor), axial (single or multiple rotor) or transverse flux direction (inner, outer or side rotor). At a fixed operating speed, the generator can be directly coupled to the electrical grid. However, the frequency of the generator varies with the speed. Usually, the optimal efficiency, at full load, is obtained at a higher frequency than the grid frequency of 50 or 60 Hz. A generator with a short axis length and low weight is preferred in the application. Permanent magnets may be of the metallic types (ALNiCo) metal oxide type (Ba Sr Ferrite) or high energy (NdFeB or SmCo). High temperature grades may be necessary if it is built close to the expander. The magnetic material may be silicon based steel or amorphous iron. With high efficiency generators, considerably less or even no load losses and load dependent losses are obtained than with conventional electrical machines. The no-load losses are mainly magnetic material losses (e.g. iron) and eddy current losses in magnets and conductors (e.g. copper).

The EC-unit 7 comprises a converter for converting the AC or pulsed DC current of the generator into the AC (or DC) voltage of the grid. This may be done with a DC voltage link converter (back to back inverters). Alternatively, electrical current for a DC grid or batteries may be provided by using other appropriate converters.

As the power generation is quite compact, the system may be used in combination with batteries or ultracapacitors. In this way it works efficiently in stand alone applications. During warm-up, and during load changes, the batteries are used, where the ORC generator compensates rather for average power need. It may be useful for energy independence purposes in agriculture, for vehicles and boats.

The electronic circuit of the EC-unit 7, based on a microcontroller or DSP or FPGA, may control the system. It controls i.e. the start, the converter the fuel admission, the fan, the water and room temperature.

In FIG. 1, for clarity, the necessary thermal insulation and protection valves are not drawn. Also the temperature and gas sensors for control and protection are not shown.

The condenser 6a is used to condense the working fluid that is in gaseous phase after the expander 5a. The output of this heat exchanger is condensed working fluid of the ORC and heated water or air for use in e.g. the central heating system, e.g. for room heating and/or producing hot sanitary water.

The gas-tight enclosure 5 from FIG. 9a may be located inside an additional heat exchanging unit 6b (as shown in FIG. 9a). Heat exchanging unit 6b absorbs losses in the condenser and helps the condensation of the working fluid in the condenser 6a. The heat exchanging unit 6b may be a double wall or a tube around the enclosure 5. It may have a different shape with flanges, connections at the top and the like.

An additional heat exchanging unit 6c may be provided for further heating the fluid of the central heating system 100, using the low temperature heat of the exhaust gas 120 at the outlet of the evaporator 4.

The EC-unit 7 is a power electronic control unit. It contains the converter for variable speed control of the generator and the control of fan 11, conveyor motor 10 of the conveyer 2, and oil pump 5d. The converter for the variable speed generator works by preference without position sensor. The conveyor motor 10 may be controlled in variable speed or on/off.

A unit is provided to couple the combined heat power system 110 to the grid 8. The grid is normally AC, but may be DC in special cases with energy storage, such as batteries or in parallel to renewable energy productions. In AC, single phase as well as three-phase connections are possible.

The room 9 is the ash tray it may be sufficiently large to be emptied only a few times per year.

The fan 11 for combustion air control may be driven by a variable speed brushless DC motor. It may be subdivided in primary secondary, tertiary air admission (which is not shown). One can also locate the fan at the exhaust 16.

An ignition unit 12 may be provided. The ignition unit 12 may be a heating wire or plug. A possible example is given in FIG. 8. It may use an auxiliary solid or gaseous, easy to ignite fuel, such as propane, butane, methane, natural gas, methanol, ethanol, kerosene, gasoline, gas-oil, or with some solid fuels, or special purpose fuels for ignition.

The inlet 13 is the water or air inlet from the central or room heating circuit, and/or sanitary water heating.

The outlet 14 is the water or air outlet, from the central heating or room heating circuit, and/or sanitary water heating, of which the circulating pump is not shown.

The outlet 16 is the outlet to the chimney.

The heat exchanger 17, being an input economizer, preheating the inlet air with residual heat from the exhaust gas in the chimney may be provided. It can be concentric tubes to outside, the outlet being in the centre.

The heat exchanger 18 is an intermediate economizer using the residual heat after the expander 5a to preheat the working fluid after the liquid pump 5c. The provision of the heat exchanger 18 is advantageous in case heavier molecule mass organic fluids, which have a high specific latent heat (a high Cv=specific heat at constant volume) are used in the ORC. It may comprise tubes being in thermal contact.

Optionally, the generator has a sufficiently higher efficiency than the normal state of the art, "premium efficiency" limits in US or "EFF1" limits in Europe, for induction motors. For example above 90% for 1 kW and higher than 95% for 10 kW.

Especially permanent magnet or hybrid generators with, by preference, more than 2 poles, e.g. 4 poles or more, can achieve such a high efficiency, combined with a low weight and axis length. They can be radial flux interior magnet, radial flux exterior magnet, axial flux or transverse flux. The highest efficiency may be the axial flux type, but the other types may be more conventional and so easier to construct. Switched reluctance generators allow operation in higher temperatures.

FIGS. 2, 3, 4, 5, 6 and 7 show some possible converter topologies. In the drawings IGBTs or mosfets are shown but also other power electronic devices like bipolar transistors, JFETs or GTOs or MCTs or IGCTs may be used. The generator is drawn three-phase, but also a single-phase, two-phase, 4-phase, 5-phase ore more phases may be used. The output is typically single phase or three-phase injection to the grid.

With a careful design, so that the condensate can return to the evaporator at standstill, and an expander without a dead angle, the expander can be self starting. In that case, a rectifier is sufficient to convert the electric power of the generator into DC, with a boost converter to adapt the voltage depending on the speed. A DC to AC converter can feed it into the grid. The whole converter can be made with a maximum efficiency above 95%.

The converter has a normal energy flow towards the grid, but at starting-up the generator may be used as a motor drive. It also acts as a motor in the air conditioning mode. The power is regulated by the converter, by current, voltage or frequency.

Figure 2:
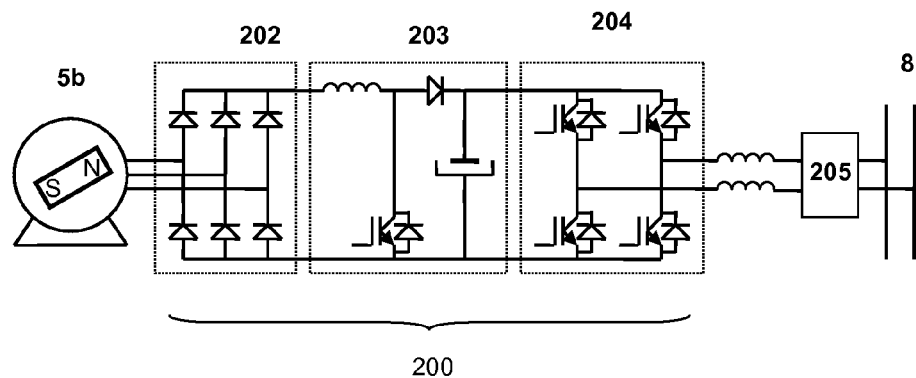
FIGS. 2, 3, 4, 5, 6 and 7 show possible converters for use in the generator unit of the combined heat power system according to the first embodiment of the present invention

FIG. 2 shows a three-phase AC to single-phase AC converter 200. The three-phase AC electrical output of generator 5b is rectified with rectifier bridge 202. The voltage and speed adaptation is done by a boost converter 203. The inverter 204 converts it to single-phase AC (with pulse width modulation PWM) and it is injected into the grid 8 by an EMC filter 205. For FIG. 2 the expander must be self starting.

Figure 3:
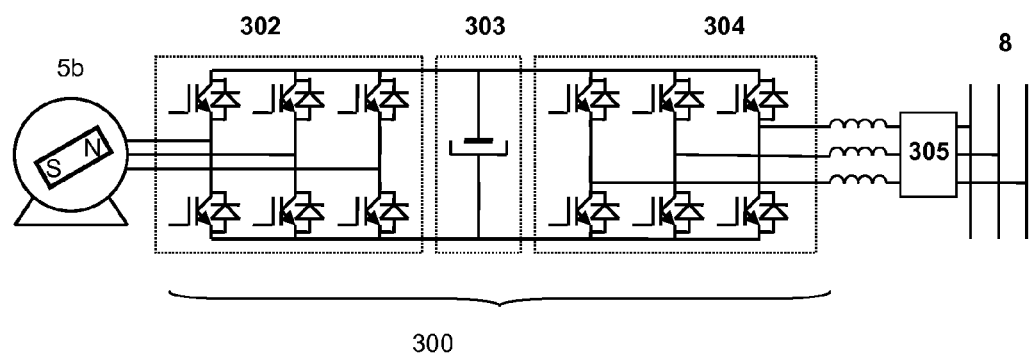

FIG. 3 shows a three-phase AC to three-phase AC converter 300. The three-phase AC output of generator 5b is converted with PWM (Pulse Width Modulation) 302 to the DC link 303. The inverter 304 converts it to three-phase AC (with pulse width modulation) and it is injected into the grid 8 by an EMC filter 305. In FIG. 3, the expander 5a coupled to generator 5b has not to be self starting. If the expander 5a is not self-starting, the generator 5b is started as a sensorless motor like a permanent magnet AC, a stepper motor or sensorless brushless DC motors. It is also possible to use a position sensor, but this sensor has to withstand the working fluid and oil. The voltage adaptation in the generating mode can be done by field-oriented control or by brushless DC techniques. One possibility for generating (=braking) is to switch all lower (or upper) transistors on, wait until the current rises and then switch them all off while the energy is transferred to the voltage link capacitor 303 by the freewheel diodes in the transistors. This operation mode is easy to perform sensorless.

Figure 4:
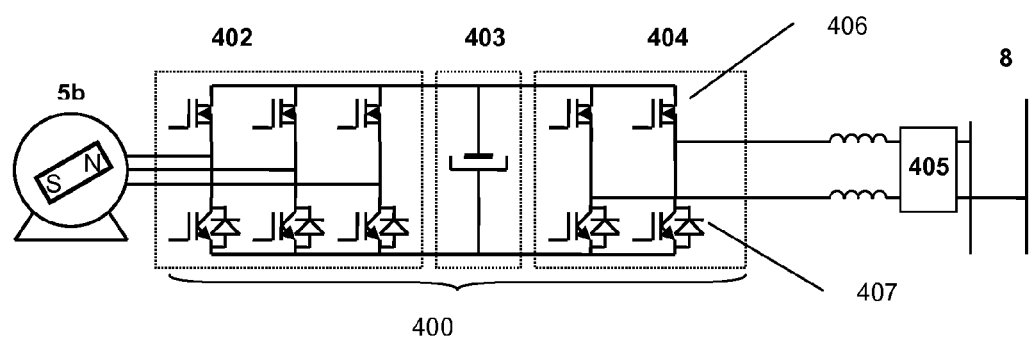

FIG. 4 shows a three-phase AC to single phase AC converter 400 with injection to the grid 8. The converter 400 converts the three-phase AC output of generator 5b and uses the high speed of the mosfets 406 as fast switches, combined with the low reverse recovery charge of the diodes in the IGBT transistors 407. The unit 402 has the same functionality of 302, but can realise lower (switching) losses. The voltage link capacitor 403 corresponds to 303. The inverter bridge 404 with mixed IGBT and mosfets can realise lower switching losses than with IGBT or mosfets alone. It can combine the low switching losses of mosfets, with the low recovery charge of the antiparallel diode in an IGBT. The single phase current is injected into the grid 8 by an EMC filter 405.

Single phase injection to the grid using inverter 204 or inverter bridge 404 for a 1 kW, 230V and a switching frequency of 50 kHz, 90 efficiency % for normal (no special fast recovery diode) mosfets, 95% efficiency for a fast IGBT used in inverter 204, 96% efficiency in a combined circuit like the inverter bridge 404 with mixed IGBT and mosfets may be obtained. This last efficiency may be further improved by using a lower frequency and better inductors. Also fast IGBTs can be used instead of mosfets for reducing switching losses and slow IGBTs for realising a low voltage drop.

Figure 5:
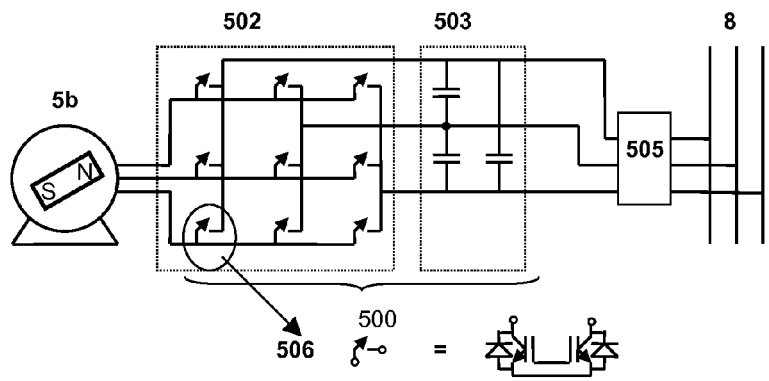

FIG. 5 shows a converter 500 for converting the three-phase AC output of generator 5b. The converter 500 comprises a three-phase AC to three-phase AC matrix converter 502 with AC capacitors 503 and EMI filter 505. It injects power to the grid 8. The matrix converter 502 comprises controllable switches 506, that can be made using IGBT's in antiseries.

Figure 6:
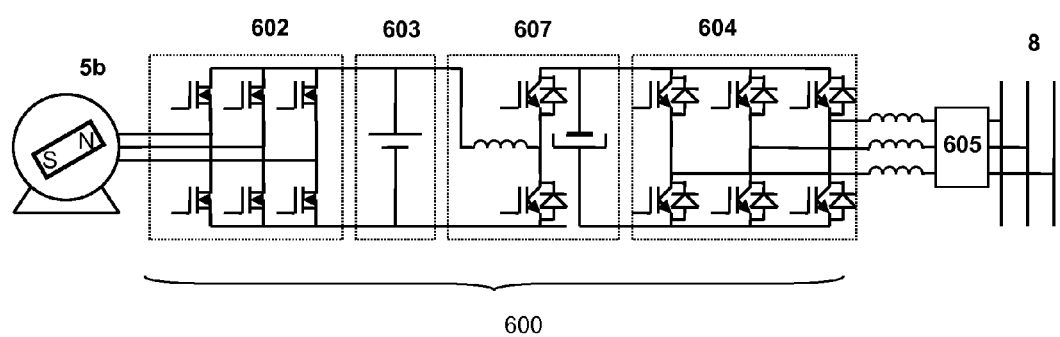
Figure 7:
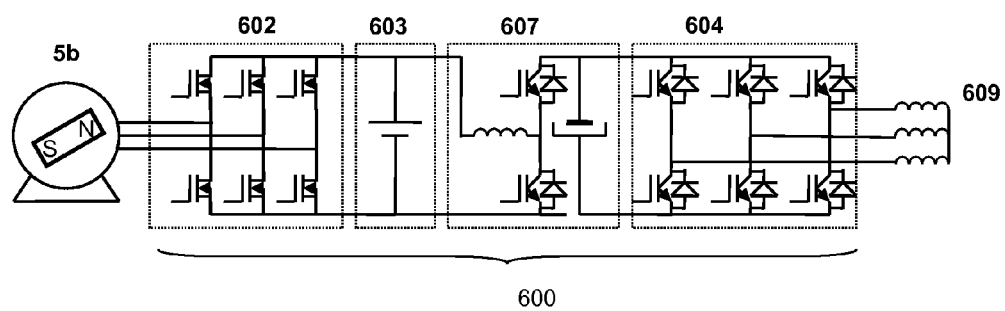

The FIGS. 6 and 7 show converters with battery storage. FIG. 6 shows it for stand-alone grid operation. FIG. 7 shows it for a vehicle application. Several units and motors may be used.

FIG. 6 shows a converter 600 for converting the three-phase AC output of generator 5b. The converter 600 comprises an intermediate DC storage 603, which may be batteries like lead acid, nickel-cadmium, nickel-metal hydride, Lithium (-ion or -polymer) based batteries. Good DC voltages are in the range 20V-400V. Also supercapacitors may be used. A converter like 607 converts it to higher voltage levels. The element 602 is an AC to DC converter with mosfets, 607 is a boost converter, 604 is a three-phase inverter to the grid 8 via an EMC filter 605. The unit 602 can be replaced by a circuit like 202, 302 or 402.

FIG. 7 shows a converter 600 with an intermediate DC storage, as in FIG. 6, coupled to motor drives 609. The unit 604 can be repeated, so that it can drive several motors, for one or more axes or for each wheel, or in ships for one or more propellers.

Figure 8:
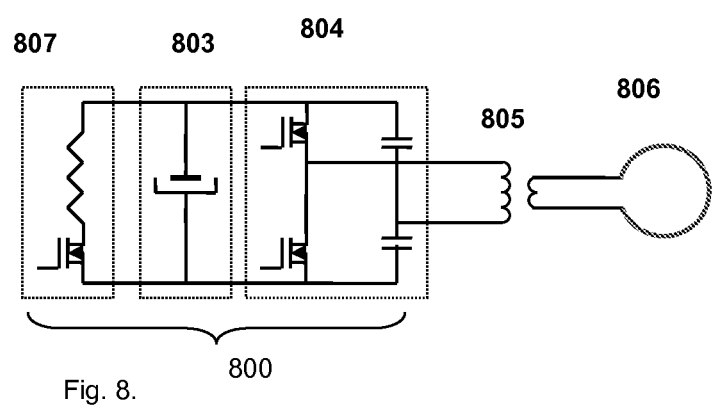
FIG. 8 shows an example of a high frequency converter for feeding an electrical heating rod of a starting unit of a burner of a central heating system

FIG. 8 shows an example of a high frequency converter 800 for feeding an electrical heating rod 806, e.g. for starting the burner 3. Typical frequencies between 10 kHz and 1 MHz allow to reduce the size weight of the transformer and increase its efficiency. The rod may be folded or bent. The capacitor 803 has the same function of 603, the item 804 is a converter from DC to high frequency. The resistance increase by skin-effect at high frequency of magnetic alloys may be used. In this drawing also a braking resistor 807 is shown. This is used when the DC link becomes too high, for example at an interruption of the connection to the grid 8.

The converter of the generator unit has a normal energy flow to the grid, but at starting-up the generator may be used as a motor drive. The power is regulated by the converter, by current, voltage or frequency.

Figure 9B:
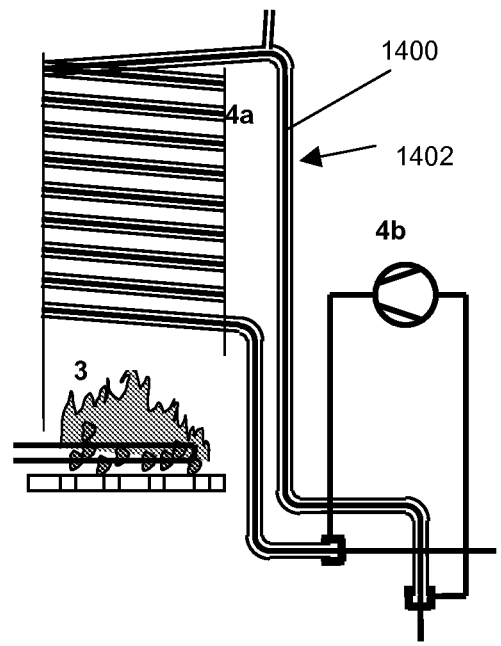
Figure 9C:
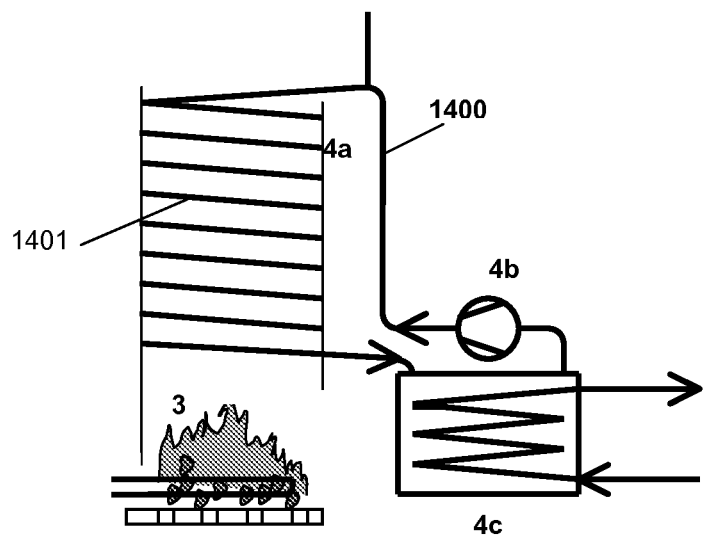

FIG. 9a, FIG. 9b and FIG. 9c show more details of the embodiment of FIG. 1. The same references refer to the same features.

FIG. 9a is a more detailed view of the embodiment of FIG. 1.

As shown in FIG. 9c, the thermal oil can give its heat to the working fluid by a heat exchanger 4c and circulating pump 4b. The thermal oil 1400 is heated by the exhaust gas of the burner 3, by having the exhaust gas to flow through a tubular coiled duct 1401 for conducting the thermal oil.

A special form of heat exchange is using the exchanger in situ as shown in FIG. 9b: The thermal oil 1400 is heated by the exhaust gas of the burner 3 by having the exhaust gas to flow through a tubular coiled double walled duct 1402. Inside the inner tube the working fluid is conducted. Between the two walls of the double walled duct, the thermal oil is provided. A pump 4b pumps the thermal oil between the walls of the double walled tube.

In FIG. 9a, a double walled tube is used without thermal oil pump 4b. The thermal oil level or pressure can be monitored. The overpressure of the thermal oil may have a conduct outside the building or into an absorbing sandbox. The outer tube may have an oval or other non round section to improve the useful surface.

The thermal oil should be still liquid at normal operating temperatures between 200° C. to 400° C. and by preference also liquid at stand by. Hydrocarbon, silicone, siloxane, polyolethers and polyolester, fluorinated oil types and other oil types may be used. Vegetable oils such as castor oil (ricinus oil) may be used. Castor oil still may suffer from some toxicity. As an other alternative of vegetable oil, avocado oil may be used. Avocado oil is a non-toxic vegetable oil suitable for high temperatures, i.e. the temperatures applicable according to the present invention. Alternatively it is also possible replacing the thermal oil by a preferentially inert gas under pressure such as helium, neon, nitrogen, by air or hydrogen.

Figure 10A:
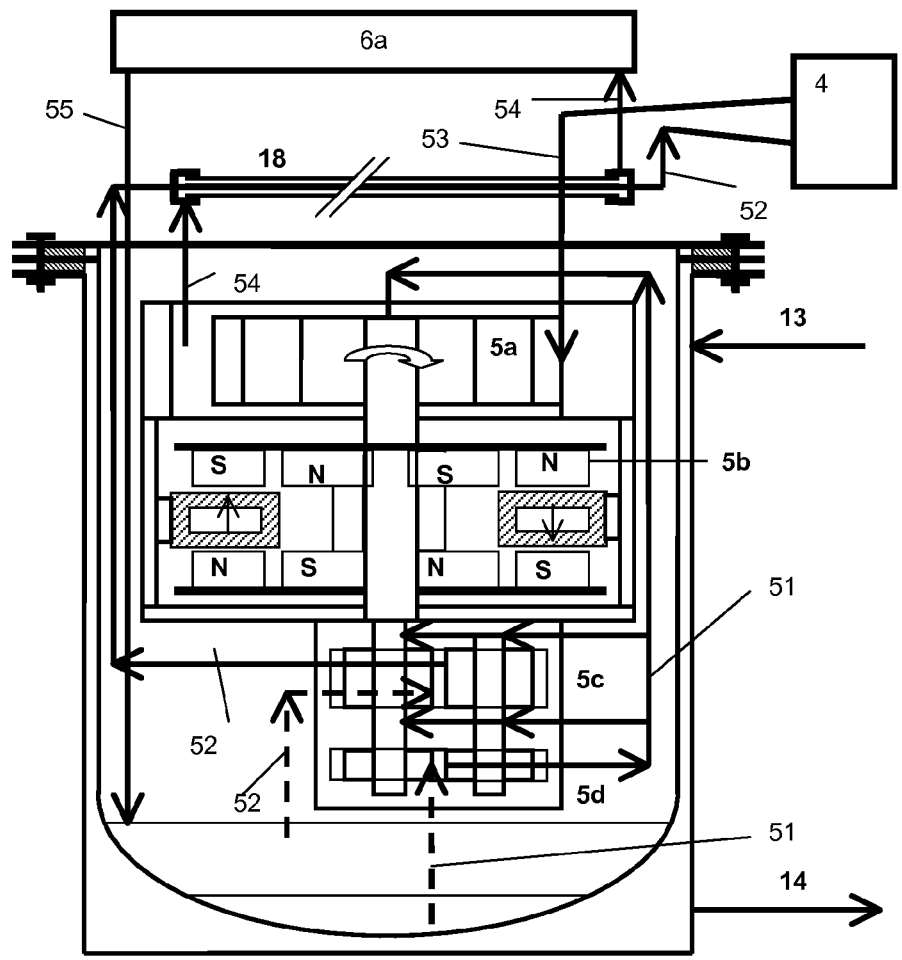
FIG. 10a and FIG. 10b show possible details of gas tight enclosure of the combined heat power system of FIG. 1.
Figure 10B:
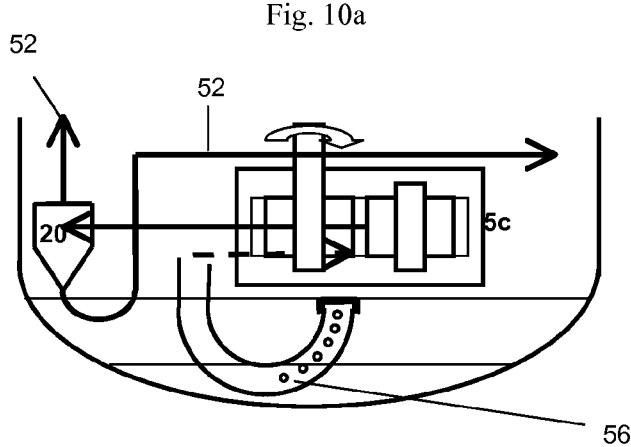

FIG. 10a and FIG. 10b show possible details of gas tight enclosure 5. FIG. 10a shows a separate oil pump and fluid pump 5d. Pump 5d pumps oil to the expander 5a, the generator 5b, the liquid pump 5c via conduits 51 working fluid is pumped by liquid pump 5c via the heat exchanger 18 to the evaporator 4 by means of conduits 52. Vaporised working fluid is brought to the expander 5a by means of conduits 53 the expanded working fluid is guided to the condenser via conduits 54 via the heat exchanger 18. From condenser 6a, the condensed working fluid is brought back to the inner space of the gas-tight enclosure 5 via conduits 55.

FIG. 10b shows an alternative single pump 5c with mixing tube 56. The mixing tube can be made with holes, sleeves or integrated with filter. After the pump 5c, a working-fluid/oil separator 20 is put, such as a cyclone type as shown or simply gravity type. After the separator, the oil is guided to the other devices to be lubricated, whereas the working liquid is guided to the evaporator 4.

FIGS. 11 to 14 show schematically several high efficiency generators.

Permanent magnet generators are already improvements on induction generators. FIGS. 11 to 14 show improvements in permanent magnet generators while reducing no-load and load losses (copper, iron and eddy current losses) compared to the usual machines or generators.

Figure 11:
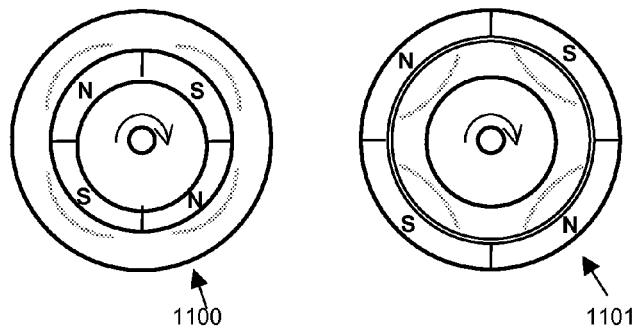
FIGS. 11 to 14 show schematically high efficiency generators being part of embodiments of the combined heat power system of FIG. 1

FIG. 11 shows usual radial flux inner permanent magnet generator 1100 and radial flux outer rotor permanent magnet generator 1101.

Figure 12:
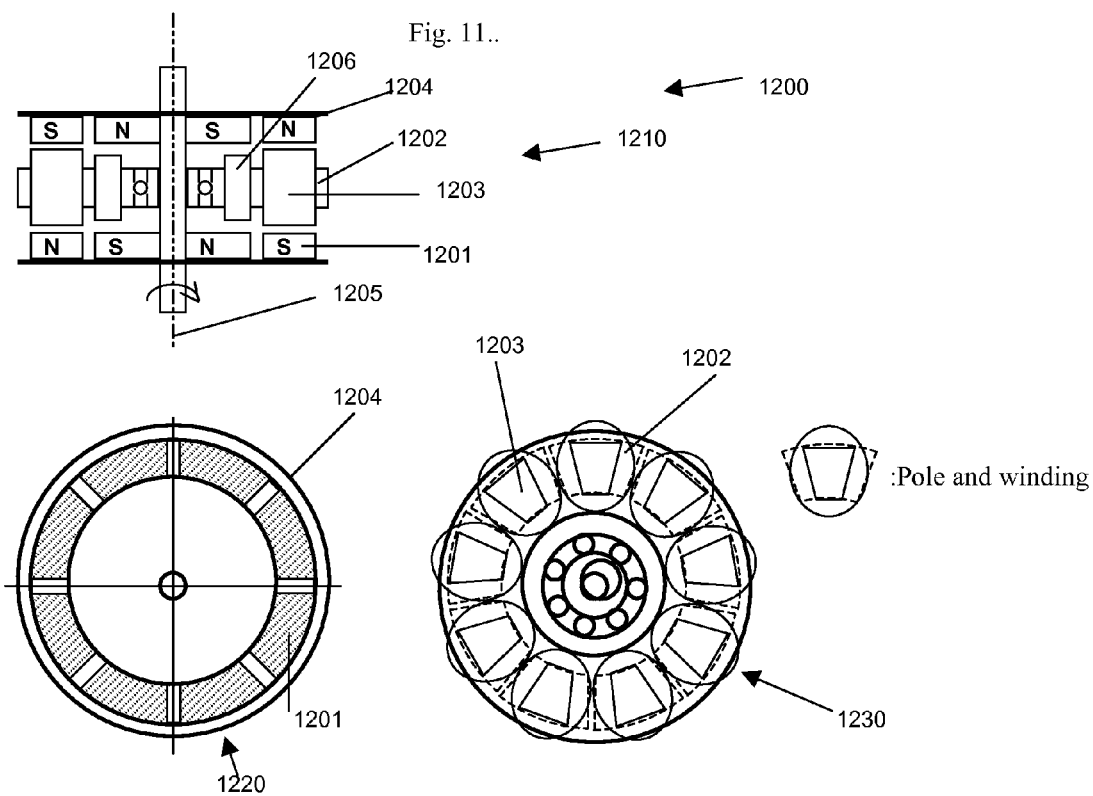

FIG. 12 shows an axial flux concentrated pole radial flux permanent magnet generator 1200, wherein 1201 indicates the magnets, 1202 is copper material and 1203 is laminated or powdered iron. 1206 is a spacer. 1202 indicates the disc, being the rotor yoke. A side view of the generator is indicated 1210, a radial section according to a plane perpendicular to axis 1205 of a disc 1204 is indicated 1220, whereas a radial section according to a plane perpendicular to axis 1205 of the stator is indicated 1230.

Figure 13:
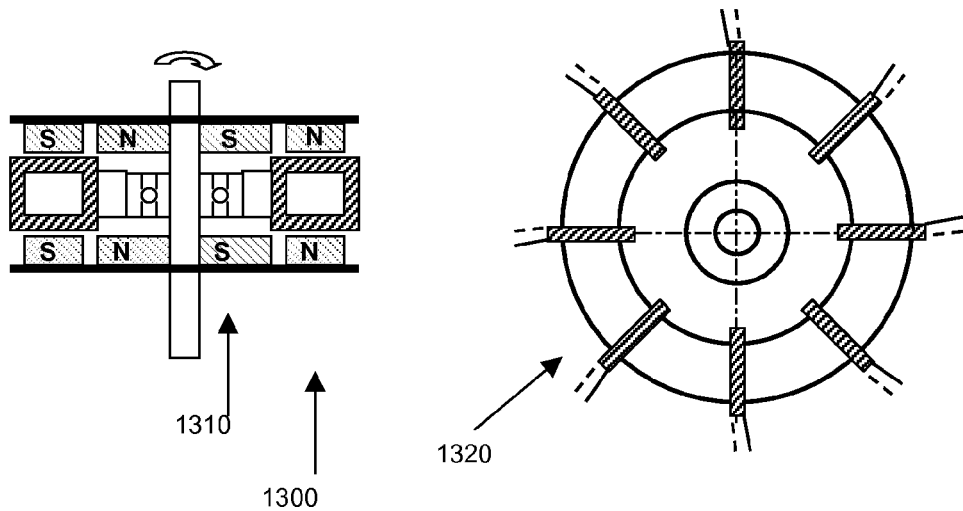

FIG. 13 shows an axial flux permanent magnet generator 1300 with a lap winding on a toroid. The toroid is made of laminated iron, amorphous based materials or powder magnetic material. A side view is referred to by 1310, a radial cross section of the stator is referred to by 1320.

Figure 14:
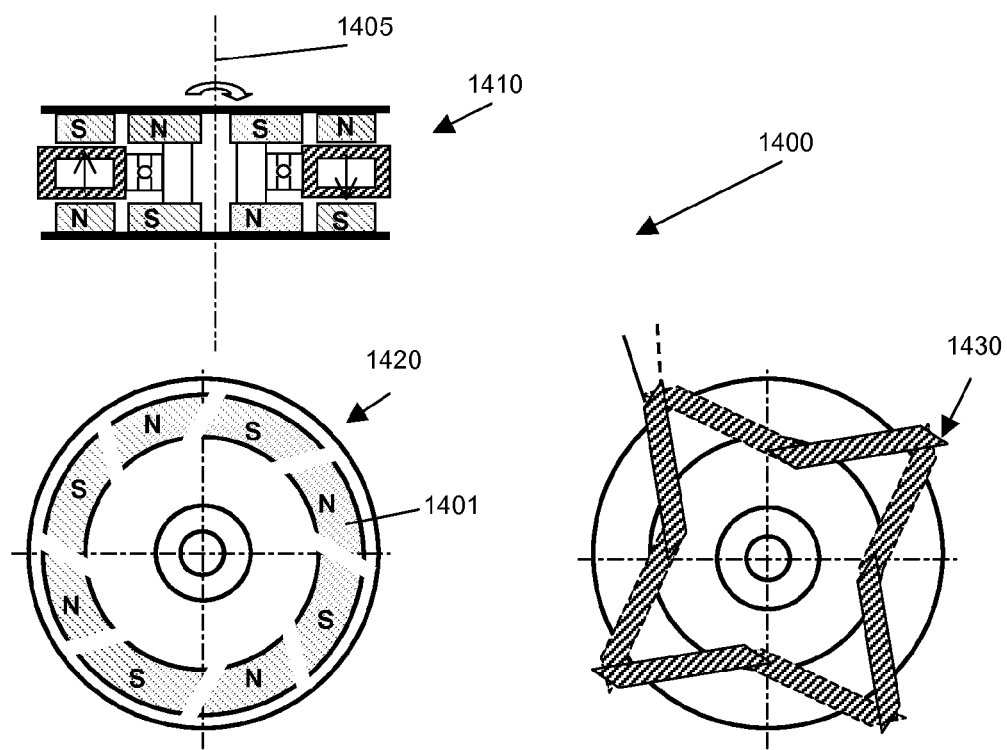

FIG. 14 shows an axial flux permanent magnet generator 1400 with a wave winding on a toroid. Only $\frac{1}{6}^{th}$ of the windings are shown, corresponding to 50% of one phase of a three-phase, 8 pole winding. The iron in the stator may be thinner than in FIG. 13 or can be even suppressed. A side view of the generator is indicated 1410, a radial section according to a plane perpendicular to axis 1405 of a rotor 1404 is indicated 1420, whereas a radial section according to a plane perpendicular to axis 1405 of the stator is indicated 1430. For optimal performance, the magnets 1401 may be skewed as shown in FIG. 14. For better performance, the gaps between the magnets may be filled with magnets in the tangential direction, in the known 'Halbach' configuration (the magnetizing parallel to the disk). Alternative embodiments may include various shapes, including round or rectangular magnets and combinations of round and rectangular magnets. In FIGS. 12, 13 and 14, diverse shapes of the stator variants can be made with or without slots, closed slots or buried teeth. The presence of teeth and slots allows reducing the thickness of magnets, but increases the iron loss and possibly also the eddy currents in the magnets, so the practical design of slots and teeth is a compromise of such effects.

The combined heat power system may be used in combination with a combustion engine such as a diesel combustion engine, in particular engines running for a long period in steady state regime such as engines of boats or trains or long distance trucks.

The water cooling circuit of the engine uses the fluid in liquid phase from the combined heat power system. This fluid is partly evaporated by the thermal energy obtained by cooling the engine. Heating the fluid generates vapour. A heat exchanger, on its warm side provided with burnt or exhaust gases of the exhaust, is used to complete the evaporation of the fluid on the cold side of the heat exchanger. The fluid in gaseous phase may even be overheated by means of this heat exchanger as well. The fluid in gaseous phase is expanded in a volumetric expander. After condensing in a condenser, e.g. in a radiator of the vehicle, the fluid in liquid phase is pumped again to the motor cooling circuit for evaporation, hence to complete the ORC cycle.

In practice, the power coming out of that ORC can be used to feed a battery in a vehicle. The electric energy stored in the battery may be used to drive electrical motors to improve peak power for e.g. acceleration and climbing hills. In this way, the total size of the original diesel engine can be significantly reduced, as it has to deliver the average power need and not the maximum or peak power. The average power need is substantially defined by the mechanical and aerodynamic friction.

Presently known vehicle engines usually have practical average efficiencies between 15% and 25% as their engine is mainly used in partial load, no load and braking modes.

The possible efficiency increase by the described technology is significantly larger than could be obtained by normal hybrid vehicles where the heat loss is not recuperated by ORC.

A normal diesel engine has for example an optimum efficiency of 40%, where 60% of the energy is converted to heat via exhaust or thermal energy provided to the engine cooling circuit. 15% to 20% of this the heat output may be converted to mechanical power by an ORC according to the present invention.

This results in a total possible efficiency of 49-52% for the engine, such as diesel combustion engine, in particular engines running for a long period in steady state regime such as engines of boats or trains or long distance trucks.

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A combined heat power system comprising:
   a Rankine cycle, said Rankine cycle using a fluid both in gaseous phase and liquid phase, said Rankine cycle comprising
      an evaporator configured to evaporate the fluid from liquid phase to gaseous phase;
      an expander configured to expand the fluid in gaseous phase provided by the evaporator, the expander being suitable to transform energy from the expansion of the fluid in gaseous phase into mechanical energy;
      a condenser configured to condense the fluid from gaseous phase from the expander to liquid phase; and
      a fluid pump configured to pump the fluid in liquid phase provided by the condenser to the evaporator;
   a heat source that provides exhaust gas, said exhaust gas providing thermal energy to evaporate the fluid from liquid phase to gaseous phase by said evaporator,
   a generator unit configured to convert mechanical energy from the expander to electrical energy to inject power into a grid or a battery, the expander being a volumetric expander, and
   an oil pump configured to provide oil to the generator unit, the expander, and the fluid pump,
   wherein said expander, said generator unit and said fluid pump are coaxially mounted so that the fluid pump is mounted below the expander.

2. The combined power system according to claim 1, wherein said Rankine cycle uses an organic fluid.

3. The combined heat power system according to claim, 1, wherein said heat source is a burner for burning biomass.

4. The combined heat power system according to claim 1, wherein said volumetric expander comprises any of a vane expander, a reciprocal piston expander, a screw expander, a rolling cylinder expander, a positive displacement expander, a hypocycloid expander or a epicycloid expander.

5. The combined heat power system according to claim 1, wherein said volumetric expander comprises a scroll expander.

6. The combined heat power system according to claim 1, wherein said generator unit comprises a rotary generator.

7. The combined heat power system according to claim 6, wherein said expander, said rotary generator and said fluid pump are mounted in one gas-tight unit.

8. The combined heat power system according to claim 1, the generator being a permanent magnet generator.

9. The combined heat power system according to claim 8, the generator being an axial flux permanent magnet generator dual rotor with a large number of poles and concentrated pole winding.

10. The combined heat power system according to claim 1, wherein said generator unit further comprises a variable speed converter for converting the variable frequency of said generator unit to the grid frequency.

11. The combined heat power system according to claim 10, wherein said converter is used to inject power into the grid or into a battery, wherein the converter comprises an AC to DC section based on a circuit using MOSFET and IGBT as controlled switches, where the MOSFET and IGBT are connected in series in each leg.

12. The combined power system according to claim 11, wherein the MOSFET has a slow diode with large recovery charge but low switching losses, and the IGBT has a fast diode but more switching loss.

13. The combined heat power system according to claim 11, wherein the MOSFET is used to switch at a higher frequency than the IGBT.

14. The combined heat power system according to claim 1, wherein said system is part of a central heating system.

15. The combined heat power system according to claim 1, wherein the oil pump is coaxially mounted with said expander, said generator unit and said fluid pump, and wherein said oil pump is mounted below the fluid pump.

16. The combined heat power system according to claim 1, further comprising a fluid/oil separator coupled to the fluid pump, said fluid/oil separator configured to separate oil and the fluid so that the oil is guided to the generator, the expander, and fluid pump and the fluid is guided to the evaporator.

17. A combined heat power system comprising:
    a Rankine cycle, said Rankine cycle using a fluid both in gaseous phase and liquid phase, said Rankine cycle comprising
       an evaporator configured to evaporate the fluid from liquid phase to gaseous phase;
       an expander configured to expand the fluid in gaseous phase provided by the evaporator, the expander being suitable to transform energy from the expansion of the fluid in gaseous phase into mechanical energy;
       a condenser configured to condense the fluid from gaseous phase from the expander to liquid phase; and
       a fluid pump configured to pump the fluid in liquid phase provided by the condenser to the evaporator;
    a heat source that provides exhaust gas, said exhaust gas providing thermal energy to evaporate the fluid from liquid phase to gaseous phase by said evaporator, and a generator unit configured to convert mechanical energy from the expander to electrical energy to inject power into a grid or a battery, the expander being a volumetric expander, wherein said expander, said generator unit and said fluid pump are coaxially mounted so that the fluid pump is mounted below the expander, and wherein said expander, said generator unit and said fluid pump are coaxially mounted inside a second heat exchanging unit.

18. A combined heat power system comprising:

a Rankine cycle, said Rankine cycle using a fluid both in gaseous phase and liquid phase, said Rankine cycle comprising an evaporator configured to evaporate the fluid from liquid phase to gaseous phase;

an expander configured to expand the fluid in gaseous phase provided by the evaporator, the expander being suitable to transform energy from the expansion of the fluid in gaseous phase into mechanical energy;

a condenser configured to condense the fluid from gaseous phase from the expander to liquid phase; and a fluid pump configured to pump the fluid in liquid phase provided by the condenser to the evaporator;

a heat source that provides exhaust gas, said exhaust gas providing thermal energy to evaporate the fluid from liquid phase to gaseous phase by said evaporator, a generator unit configured to convert mechanical energy from the expander to electrical energy to inject power into a grid or a battery, the expander being a volumetric expander, and a thermal oil heat exchanger configured to transfer heat from the heat source to thermal oil inside the thermal oil heat exchanger so that the thermal oil is configured to conduct heat to the fluid in the evaporator, wherein said expander, said generator unit and said fluid pump are coaxially mounted so that the fluid pump is mounted below the expander.

* * * * *